US006733856B2

United States Patent
Nojiri (10) Patent No.: US 6,733,856 B2
(45) Date of Patent: May 11, 2004

(54) DOUBLE EYELID FORMING TAPE OR STRING AND METHOD OF MANUFACTURING THE SAME

(76) Inventor: Hideyuki Nojiri, 407-5-52-3, Hon-machi, Shibuya-ku, Tokyo (JP)

( * ) Notice: Subject to any disclaimer, the term of this patent is extended or adjusted under 35 U.S.C. 154(b) by 0 days.

(21) Appl. No.: 09/968,985

(22) Filed: Oct. 3, 2001

(65) Prior Publication Data

US 2002/0041956 A1 Apr. 11, 2002

(30) Foreign Application Priority Data

Oct. 3, 2000 (JP) ........................................ 2000-303797
May 29, 2001 (JP) ........................................ 2001-160951

(51) Int. Cl.[7] .............................. A45D 40/30; B32B 7/12
(52) U.S. Cl. ................... 428/40.1; 428/41.4; 428/42.1; 428/343; 427/208; 132/53; 132/56; 132/216
(58) Field of Search .............................. 428/343, 40.1, 428/41.4, 42.1; 427/208; 132/53, 56, 216

(56) References Cited

U.S. PATENT DOCUMENTS

| | | | | |
|---|---|---|---|---|
| 2,510,120 A | * | 6/1950 | Leander | 117/122 |
| 3,880,175 A | * | 4/1975 | Hosokawa | 132/53 |
| 4,653,483 A | * | 3/1987 | Clavin | 128/76.5 |
| 4,964,428 A | * | 10/1990 | Lamatrice | 132/216 |
| 2002/0041956 A1 | * | 4/2002 | Nojiri | 428/343 |

* cited by examiner

Primary Examiner—Daniel Zirker
(74) Attorney, Agent, or Firm—Oblon, Spivak, McClelland, Maier & Neustadt, P.C.

(57) ABSTRACT

A double eyelid forming tape or string that can form an eyelid with a clear fold easily and safely in a simple manner, and a method of manufacturing the same. An article of manufacture for forming a fold in an eyelid of a user is constructed by applying an adhesive layer on a narrow tape member, which is resiliently stretchable so as to return to its original unstretched state after being stretched, and providing holding portions having no adhering property on the surfaces at both ends thereof for holding by fingertips of the user. A fold in the eyelid of the user is formed by pressing the stretched tape member on the position of the eyelid where the user wants to form a fold in a state where both ends thereof are held and stretched, adhering the tape member thereon with the adhesive layer, and releasing the stretched tape member. Therefore, when the tape member under a tension resiliently contracts, it breaks into the eyelid and forms an eyelid having a fold.

6 Claims, 6 Drawing Sheets

DOUBLE EYELID FORMING TAPE OR STRING AND METHOD OF MANUFACTURING THE SAME

TECHNICAL FIELD OF THE INVENTION

The present invention relates to a double eyelid forming tape or string for forming a clear double eyelid easily in a simple manner, and a method of manufacturing the same.

DESCRIPTION OF THE RELATED ART

In order to form a double eyelid, a method of forming a fold in an eyelid by bonding the eyelid skin by the use of water borne latex emulsion, polymer emulsion, of the like, or a method of forming a film by adhering a single-sided adhesive tape, or applying curable polymer, thereby forming a fold in an eyelid is conventionally known. However, both of these methods have problems in that they require very exacting tasks, whereby a clear finish cannot be expected unless the user gets used to it to some extent, and in the former adhering method, the skin may be irregularly puckered by adhesion, and in the latter film forming method, the eyelid has a film left on it.

However, both of these methods have problems in that they require very exacting tasks, whereby clear finish cannot be expected unless the user gets used to it to some extent, and in the former adhering method, the skin may be irregularly puckered by adhesion, and in the latter film forming method, the film leaves a pring on the eyelid.

SUMMARY OF THE INVENTION

The present invention is intended to solve the above-described problems, and to provide double eyelid forming tape or string for forming an eyelid with a clear fold in a simple manner without puckering up the skin or leaving the print of the film thereon.

Another object of the present invention is to provide a double eyelid forming tape or string that can form a fold directly on the eyelid so that a natural double eyelid is obtained.

Further object of the present invention is to provide a double eyelid forming tape or string that the operation for forming a double eyelid is safe and easy.

Still another object of the present invention is to provide a method of manufacturing the double eyelid forming tape described above very easily.

In order to achieve the object described above, the double eyelid forming tape according to the present invention is basically comprises a resiliently elastic narrow tape member, and an adhesive applied thereon.

In the double eyelid forming tape described above, the tape member may be formed of synthetic resin being stretchable and exhibiting resilient elasticity after being stretched, and the adhesive described above may be applied on both surfaces or on one of the surfaces of the tape member.

The double eyelid forming tape described above may be provided with holding portions the surfaces of which has no adhering property at both ends for being held with fingertips.

In the double eyelid forming tape described above, the tape member may be attached with a release sheet having a breaking point that is to be broken when being applied with a tension on the both surfaces or on one of the surfaces thereof.

In the double eyelid forming tape described above, the breaking point is suitably a notched groove formed generally at the center of the length of the sheet described above, and the sheet is preferably formed of silicon paper or a film applied with silicon processing.

On the other hand, a method of manufacturing double eyelid forming tape according to the present invention comprises the steps of applying an adhesive on the both surfaces or on one of the surfaces of a given length of resiliently elastic sheet member, forming holding portions having no adhering property at both widthwise ends thereof, and cutting the same widthwise into narrow strips.

Another method of manufacturing double eyelid forming tape according to the present invention comprises the steps of applying an adhesive on one of both of the surfaces of a given length of resiliently elastic sheet member, attaching release sheet formed with a notched groove generally at the center of the length thereof on both surfaces or one of the surfaces of the seat member applied with the adhesive, and cutting the same widthwise into narrow strips.

A double eyelid forming string according to the present invention basically comprises a resiliently elastic string member, and an adhesive applied thereon.

The double eyelid forming string described above may be provided with holding portions having no adhesive property on the surfaces thereof for being held by fingertips at both ends thereof, and the string member may be covered up with a jacket having a breaking point that is to be broken when being applied with tension.

In order to form double eyelid with the double eyelid forming tape having the construction described above, the user holds both ends of the tape member and stretches it into resiliently stretched state, and in this state, places and presses the portion of the tape member applied with an adhesive at the position of his/her eyelid where he or she wants to form a fold, adheres the tape member with the adhesive thereon, and releases the holding portion at both ends. Then, the tape member under a tension resiliently contracts. Since the eyelid is normally projecting toward the front at the center thereof along the eyeball with respect to both ends, the resiliently contracted tape member breaks into the eyelid on which it is attached and forms a fold on the eyelid. The unnecessary portion on both ends may be cut afterwards.

Since the tape member forms a fold for double eyelid directly on the eyelid as described above, a natural double eyelid may be formed without puckering up the skin or leaving a print of the film on the eyelid as in the conventional method. In addition, it can be made only by stretching both ends of the tape member, and in this state, pressing it against the position of the eyelid where he/she wants to form a fold, thereby forming a clear double eyelid in a simple manner.

In the conventional method described above, the user has to use a pusher or the like to form a fold by himself/herself when bonding the eyelid skin or adhering the single-sided adhesive tape or the like on the eyelid. However, the double eyelid forming tape according to the present invention forms an eyelid with a fold by its own contractive force, and thus the pusher or the like is not necessary, and formation of double eyelid can be performed safely and easily.

PREFERRED EMBODIMENT OF THE INVENTION

Figure 1:
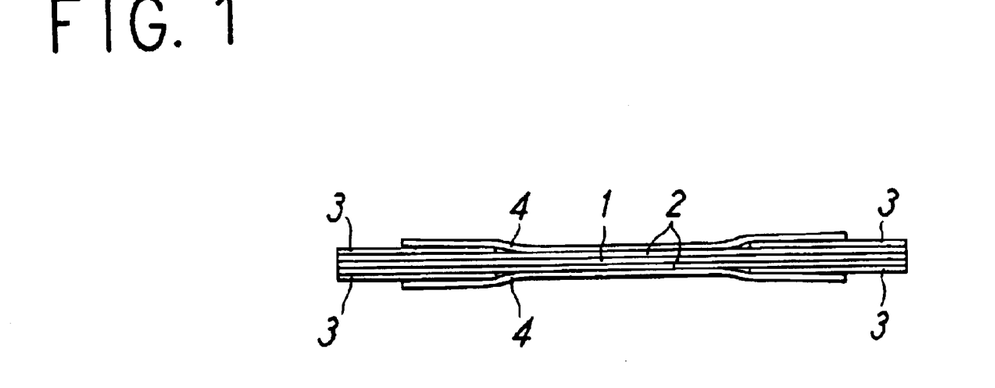
FIG. 1 is a side view showing an embodiment of the double eyelid forming tape according to the present invention.

FIG. 1 is an embodiment of the double eyelid forming tape according to the present invention.

The double eyelid forming tape can basically be constructed by applying an adhesive 2 on the front and back surfaces of a resiliently elastic narrow tape member 1. Though any tape of tape members 1 described above may be employed as far as it stretches when both ends thereof are held and stretched, and acts to contract resiliently to the original state, it is specially preferable to form it of synthetic resin being stretchable and exhibiting resilient elasticity after being stretched such as polyethylene. The tape member 1 is generally formed in a narrow tape of about 1 to 3 mm in width, but the width is not limited to that range, and the shape does not have to be of accurate tape shape.

In addition, the adhesive 2 described above may be any type as far as it can be used for the skin.

Since the tape member 1 is adhered on the eyelid with the both ends thereof held by the fingertips, it is preferably provided at both ends with holding portions 3 having no adhesive property on the surfaces thereof. The holding portions 3 are suitably formed by adhering the covering sheets on the adhesive 2 applied on the front and back surfaces of the tape-shape member 1, as shown in the figure. However, the holding portion 3 may be formed by winding covering sheets at the ends of the tape member 1, by applying an application agent or a chemical agent such as coating material or the like for suppressing adhering property at the ends of the tape member 1, or even by applying no adhesive 2 thereon.

The holding portion 3 does not have to suppress adhesive property of the adhesive completely. For example, the holding portion 3 may be formed by adhering the covering sheet only on one of the surfaces of the tape member 1, or the suitable holding portion 3 described above may be formed only at one end of the tape member 1. Generally, the holding portion 3 is preferably formed as long as 5 mm or more from the end of the tape member 1 for facilitating holding action.

In the figure, the reference numeral 4 designates a release sheet to be adhered on the portion where the adhesive 2 is applied for facilitating the handling of the double eyelid forming tape.

Figure 2:
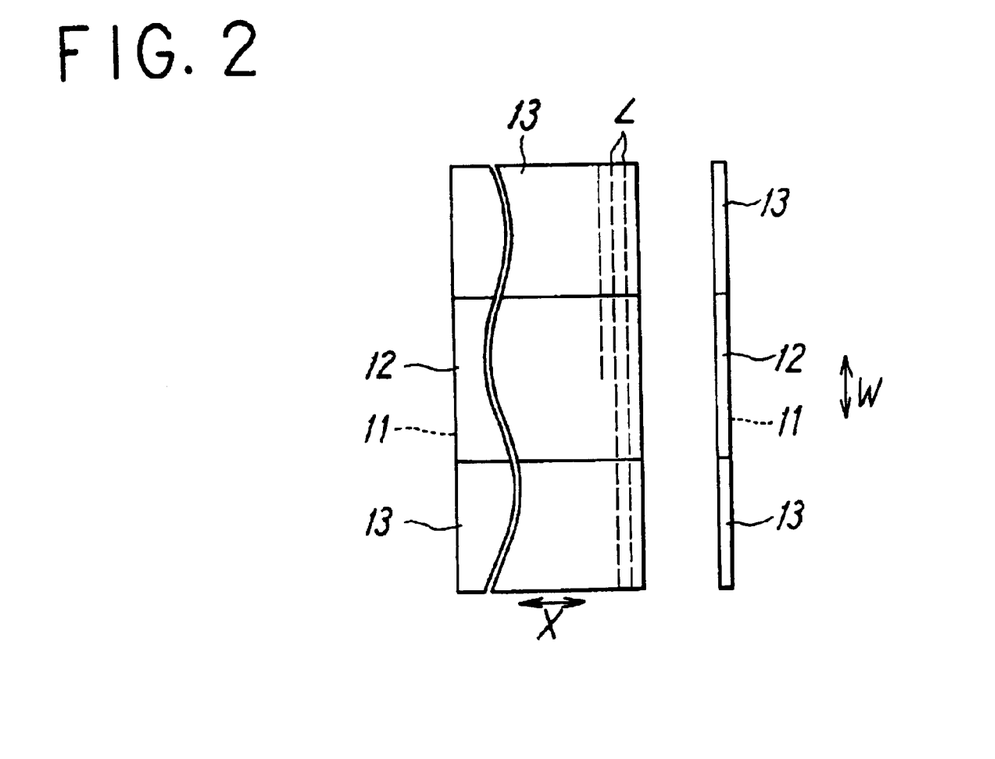
FIG. 2 is a plan view showing an example of manufacture of a double eyelid forming tape according to the present invention.

The double eyelid forming tape described above can be manufactured with extreme ease, as shown in FIG. 2, by applying an adhesive 12 on the whole area of the front and back surfaces of the resiliently elastic sheet member 11 and has a given length in the direction X, forming holding portions 13 having no adhesive property at both ends when viewed in the widthwise direction (direction W), and cutting it along a number of cutting lines L into narrow strips. In this case, the sheet member 11 may be the same material as the tape member 1 shown in FIG. 1.

The holding portion 13 may also be formed by adhering covering sheets on the adhesive 12 applied on the front and back surfaces of the sheet member 11, or by applying an application agent or a chemical agent such as coating material or the like for suppressing adhering property, as in the case of the example shown in FIG. 1. In addition, the holding portion 13 may also be formed by excluding both ends of the sheet member that are used as holding portions from application of an adhesive.

Alternatively, it can also be formed by adhering a release sheet or the like for facilitating the handling of the double eyelid forming tape on the portion applied with the adhesive 12 in advance, and cutting it with the sheet member 11 along the cutting lines L.

In the embodiment shown in FIG. 1 and FIG. 2, though the adhesive 2 is applied on both of the front and back surfaces of the resiliently elastic narrow tape member 1, it is not limited thereto. For example, the adhesive 2 may be applied only on either the front surface or the back surface of the resiliently elastic narrow tape member 1, and in this case, the release sheet 4 or the covering sheet must simply be provided on the surface applied with the adhesive 12.

In the embodiment shown in FIG. 1 and FIG. 2, though the adhesive 2 is applied on the front and back surfaces of the tape member 1 so as to cover up the whole area thereof, it is not limited thereto, and the adhesive 2 may be applied partially on the surface of the tape member 1 that is to be applied with the adhesive 2 as far as it does not have any disadvantage for adhering the tape member under a tension on the eyelid.

In other words, as far as the both ends of the tape member under a tension is adhered on the eyelid by an adhesive when the tape member is adhered on the eyelid under a tension, the tape member is adhered in such a manner that it breaks into the eyelid by its tensile strength even when no adhesive is applied on the central portion of the tape member, and thus there is no special harm in applying no adhesive on the central portion of the tape member. There is also no special harm in providing the portion where the adhesive is applied and the portion where the adhesive is not applied alternately at short intervals along the length of the tape member 1 for adhering the tape member under tension on the eyelid.

Therefore, though the adhesive 2 may be applied in such a manner that it covers the whole area of the surface of the tape member 1 on which the adhesive 2 is to be applied, it is not limited thereto, and the adhesive 2 may also be applied to cover a part of the surface of the tape member 1 on which the adhesive 2 is to be applied, as far as a special consideration is given to causing no disadvantage for adhering the tape member on the eyelid in the stretched state.

Subsequently, a method for forming a eyelid with a fold by the use of the double eyelid forming tape having the construction described above will now be described.

Figure 3:
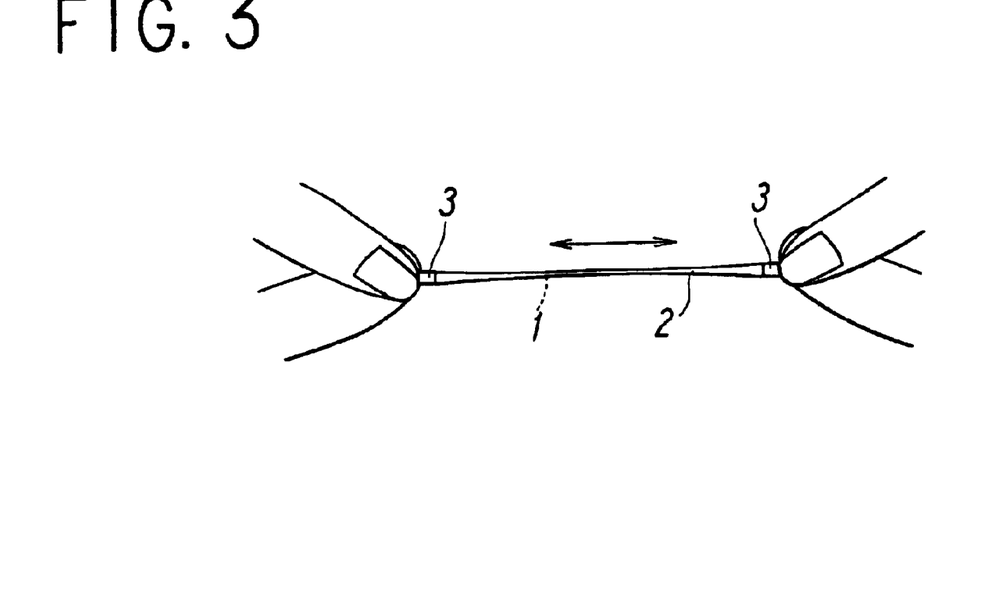
FIG. 3 is an explanatory drawing showing a state of preparing for forming a double eyelid by the use of the double eyelid forming tape according to the present invention.

FIG. 3 shows the tape member 1 formed of synthetic resin being stretchable and exhibiting resilient elasticity even after being stretched, in a state in which the tape member 1 is stretched by holding the holding portions 3 at both ends thereof with fingertips and stretching the same, in other words, the state prepared for adhering the tape member 1 on the eyelid. In this state, the tape member 1 has a constructive force for resiliently restoring to its original state.

Figure 4:
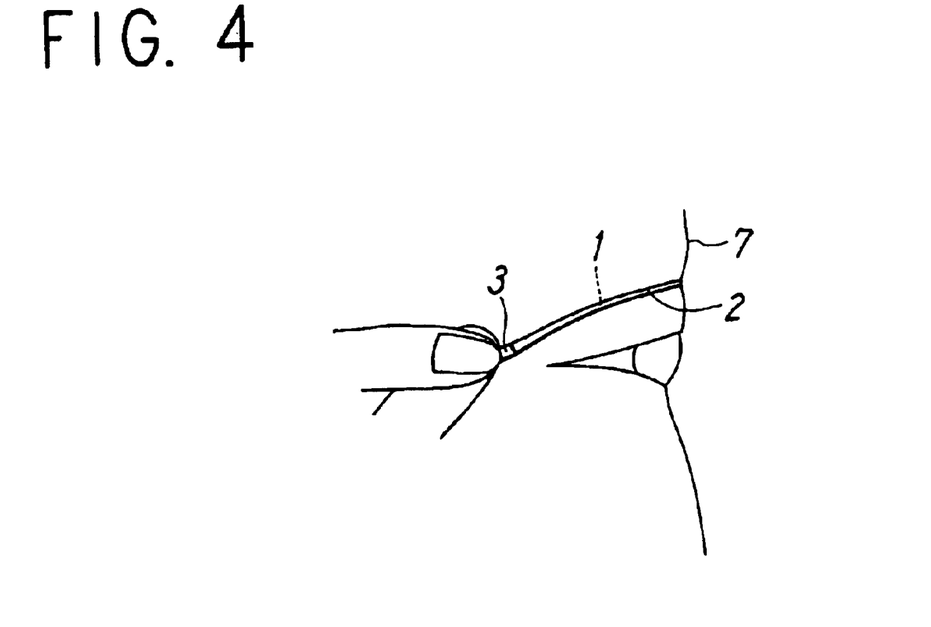
FIG. 4 is an explanatory drawing showing a state in which a double eyelid is formed by the use of the double eyelid forming tape according to the present invention.

Then, the user pushes the portion of the tape member 1 where the adhesive 2 is applied against the eyelid 7 where he/she wants to form a fold with the tape member 1 held on the opposite ends and stretched as shown in FIG. 4, adheres the tape member 1 thereon by the adhesive 2, and releases the holding portions 3 at both ends, whereby, the tape member 1 under a tension resiliently contracts. Since the eyelid is normally projecting toward the front at the center thereof along the eyeball with respect to both ends, the resiliently contracted tape member 1 breaks into the eyelid 7 on which it is attached and forms an eyelid with a fold. The holding portions 3 on both ends are cut after the fold is formed.

Since the tape member 1 forms a fold for double eyelid directly on the eyelid 7, a natural double eyelid may be formed without puckering up the skin or leaving a print of the film on the eyelid as in the conventional methods. In addition, since the user must simply press the tape member 1 being held at both ends and stretched in the opposite directions against the position of the eyelid where he/she wants to form a fold, a clear double eyelid may be formed in a simple manner.

In the conventional methods described above, the user has to use a pusher or other similar tool in order to double up the skin of the eyelid to form a fold by himself/herself when bonding the eyelid skin or when adhering single-sided adhesive tape or the like. However, the double eyelid forming tape forms an eyelid with a fold by its own contractive force, and thus the pusher or other similar tool is not necessary, and formation of the double eyelid can be performed safely and easily.

Figure 5:
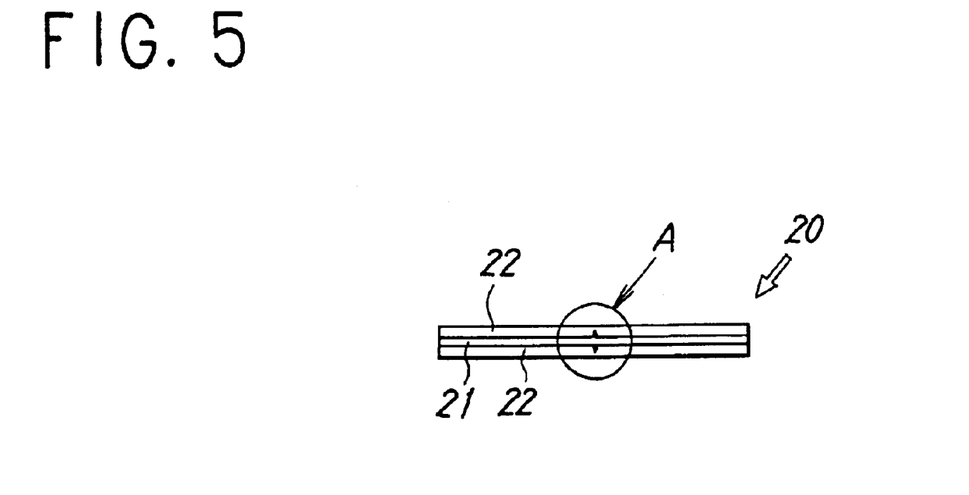
FIG. 5 is a side view showing another embodiment of the double eyelid forming tape according to the present invention.
Figure 6:
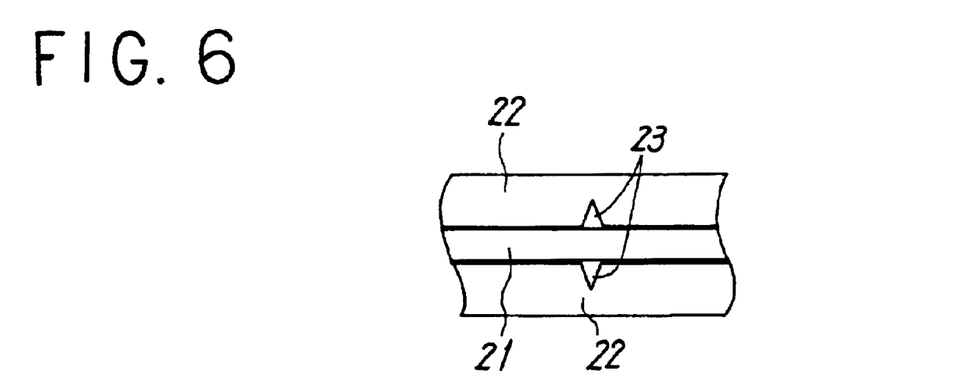
FIG. 6 is a fragmentary enlarged view of the part A in FIG. 5.

FIG. 5–FIG. 6 shows another embodiment of the double eyelid forming tape according to the present invention.

The double eyelid forming tape 20 according to this embodiment is, as shown in FIG. 5–FIG. 6, provided with sheets 22, 22 in the shape of a narrow tape having a breaking point to be broken at the center thereof by a tension adhered on the front and back surfaces of the resiliently elastic narrow tape member 21 applied with an adhesive (not shown) respectively.

The breaking point is preferably formed of a notched groove 23 formed widthwise on the adhering surface of the sheet 22, as shown in a partial enlarged view of FIG. 6.

In this case, the tape member 21 may be formed of the same material as the tape member 1 in the embodiment shown in FIG. 1, and the sheet 22 may be formed of a film applied with silicon processing or silicon paper formed of paper shaped silicon resin, so that breakage or release from the adhesive may be facilitated.

In the embodiment shown in FIG. 5–FIG. 6, though an adhesive is applied on the front and back surfaces of the tape member 21, the double eyelid forming tape 20 is not limited thereto, and, for example, may be applied with the adhesive only on either the front surface or the back surface of the tape member 21.

Figure 7:
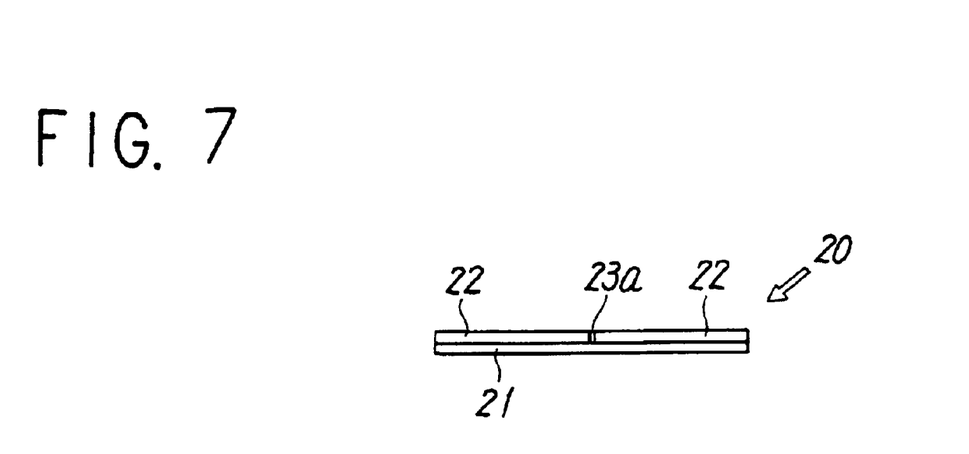
FIG. 7 is a side view showing still another embodiment of the double eyelid forming tape according to the present invention.

The sheet 22 having a breaking point does not necessarily have to be adhered on both surfaces of the tape member 21. As shown in FIG. 7, the sheet 22 having the breaking point 23a may be adhered either one of the surfaces of the tape member 21.

In the embodiment shown in FIG. 7, the adhesive is applied only on one of the surfaces of the tape member 21 and a sheet 22 having the breaking point 23a that is cut in advance is adhered only on the surface on which the adhesive 12 is applied. However, the breaking point in this case may be the one as shown in FIG. 6.

The double eyelid forming tape 20 may be constructed in such a manner that the sheet 22 is attached only on one side of the tape member 21 applied with the adhesive on both front and back surfaces, and a release sheet is attached on the other surface that is not attached with the sheet 22. The release sheet is to be peeled off when the double eyelid forming tape 20 is used.

Though the notched groove 23 may be provided on the front surface or on the back surface of the sheet 22, providing it on the backside, which is the side where the sheet 22 is attached, makes the notched groove 23 invisible and prevents it from being broken by mistake.

A method of manufacturing the double eyelid forming tape 20 is basically the same as the one described in conjunction with FIG. 2. To be more precise, it is manufactured by the steps of providing a notched groove 23 on the sheet 22 formed of a film applied with silicon processing or a sheet 22 formed of silicon paper at the center along the length thereof (corresponds to the direction X in FIG. 2), applying an adhesive on one or both of the surfaces of a resiliently elastic tape member 21, adhering the sheet 22 provided with the notched groove 23 on one or both of the surfaces of the tape member 21 applied with the adhesive, applying the sheet 22 formed with the notched groove 23 on one of both of the surfaces of the tape member 21 applied with the adhesive, and cutting it into narrow strips along a number of cutting lines oriented in the direction of width (direction W) in FIG. 2.

When adhering the sheet 22 only on one of the surfaces of the tape member 21, it is not necessary to apply an adhesive on the other surface, but it is not limited thereto. It is also applicable to adhere the sheet 22 only on one of the surfaces of the tape member 21 that is applied with an adhesive on both of the front and back surfaces, and adhere a release sheet on the surface where the sheet 22 is not adhered, and then cutting it into narrow strips along a number of cutting lines.

With this method, the double eyelid forming tape 20 may be manufactured with extreme ease.

Figure 8:
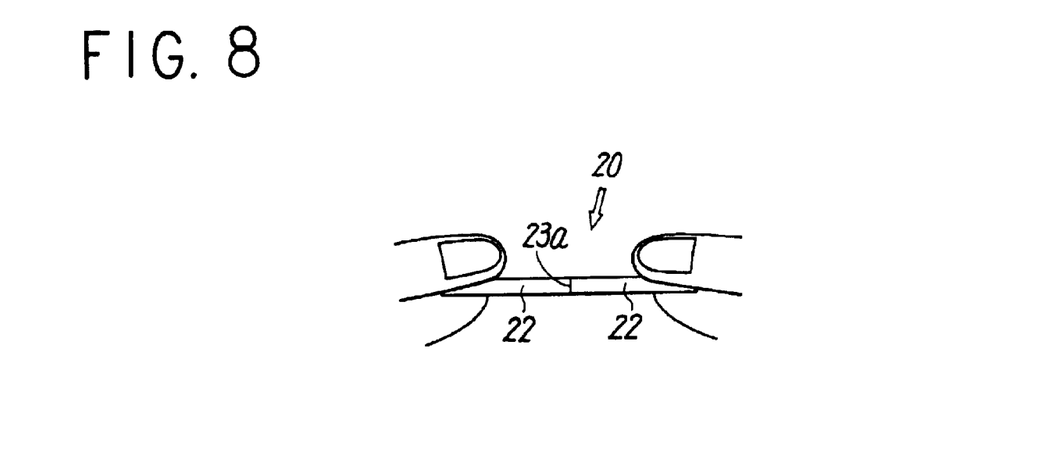
FIG. 8 is a view showing a state in which both ends of the double eyelid forming tape shown in FIG. 5 are held.
Figure 9:
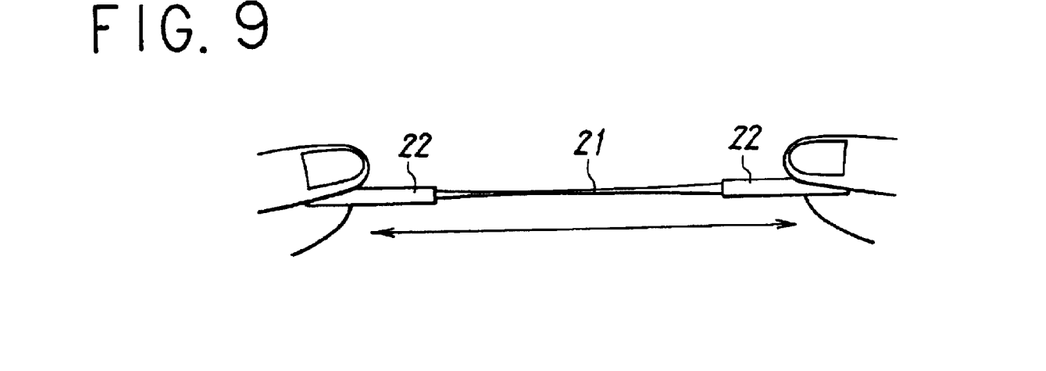
FIG. 9 is a drawing showing a state in which both ends of the double eyelid forming tape shown in FIG. 5 are being held and stretched in the opposite directions.

The double eyelid forming tape 20 is, as shown in FIG. 8, held with fingers on the left and right sides of the notched groove 23 thereof, and as shown in FIG. 9, the breaking point of the sheet 22 is broken by a tensile strength when the double eyelid forming tape 20 is stretched from the left and right sides. Therefore, the tape member 21 of the double eyelid forming tape 20 may be stretched in the lateral direction.

Figure 10:
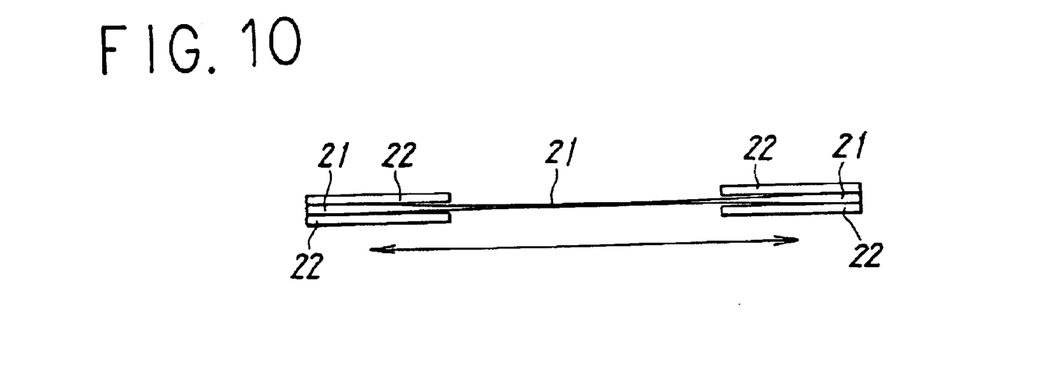
FIG. 10 is a side view showing a state in which the double eyelid forming tape shown in FIG. 5 is stretched in the opposite directions.
Figure 11:
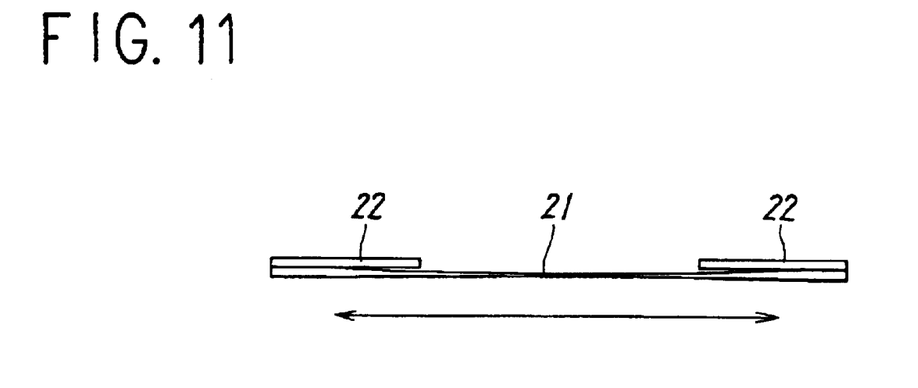
FIG. 11 is a drawing showing a state in which both ends of the double eyelid forming tape shown in FIG. 7 are being held and stretched in the opposite directions.

FIG. 10 and FIG. 11 are side views showing the double eyelid forming tape shown in FIG. 5 and FIG. 7 are stretched in the opposite directions. The tape member 21 starts to be stretched from the portion in the vicinity of the breaking point provided at the center of the length thereof when being stretched, and then the portion of the tape member 21 that is at a distance from the breaking point stretches progressively as it is stretched laterally in the opposite directions.

Though the thickness of the tape member 21 reduces when it is stretched, the appearance of the thickness of the tape member 21 shown in FIG. 10 and FIG. 11 is such that even though the center portion of the tape member 21 is already stretched, the significant portion near both ends is not started to be stretched yet. Therefore, it is understood that the tape member 21 can be stretched to the extent much longer than the state shown in FIG. 10 and FIG. 11.

The method of forming an eyelid with a fold by the use of the double eyelid forming tape 20 shown in FIG. 5–FIG. 7 is the same as the method of forming an eyelid with a fold by the use of the double eyelid forming tape according to the embodiment shown in FIG. 1.

With the double eyelid forming tape 20 according to the embodiment shown in FIG. 5–FIG. 7, since the sheet 22 having a breaking point that is to be broken when being stretched is adhered on one or both of the surfaces of the tape member 21 where an adhesive is applied, the adhesive on the tape member 21 does not stick to the fingers or other articles even without the holding portion or the release paper as in the case of the double eyelid forming tape according to the embodiment shown in FIG. 1.

When using the double eyelid forming tape 20, the tape member 21 is exposed in the stretched state only by stretching the double eyelid forming tape 20 laterally in the opposite directions. Therefore it is further convenient in comparison with the double eyelid forming tape according to the embodiment shown in FIG. 1.

Figure 12:
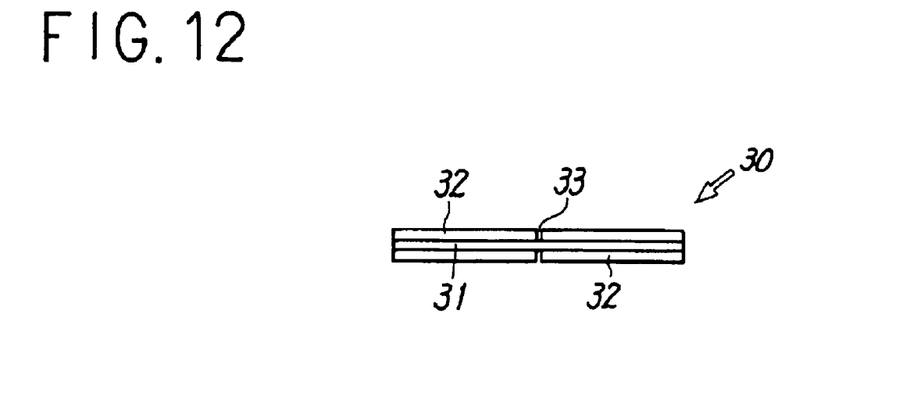
FIG. 12 is a cross sectional view showing an embodiment of the double eyelid forming string according to the present invention.
Figure 13:
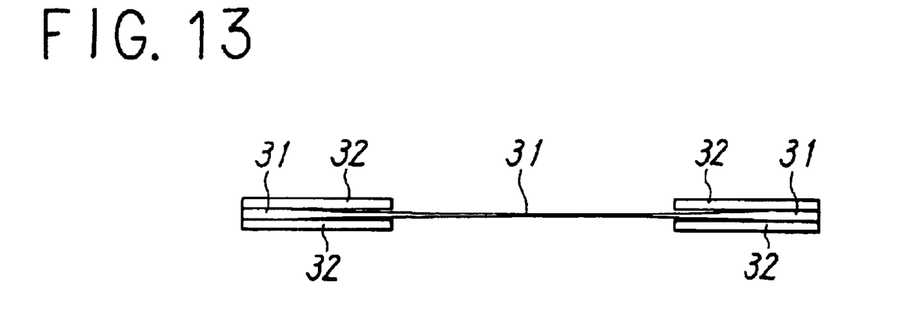
FIG. 13 is a drawing showing a state in which both ends of the double eyelid forming string shown in FIG. 12 are being held and stretched in the opposite direction.

FIG. 12 is a cross sectional view showing another embodiment of the double eyelid forming string according to the present invention, and FIG. 13 is a drawing showing a state in which the double eyelid forming string is stretched in the opposite directions.

As shown in FIG. 12, the double eyelid forming string 30 according to this embodiment is constructed in such a manner that a string member 31 resiliently elastic with an adhesive (not shown) applied thereon is sandwiched and covered by a pair of sheets 32, 32 in the shape of a narrow tape and having a breaking point 33 to be broken when being stretched at the center thereof.

The sheets 32, 32 are jackets for covering up the string member 31 applied with an adhesive, which are applied with an adhesive (not shown) on the sides that sandwich the string member 31 and joined with each other. The breaking point 33 is formed of a notched groove provided at the center of the sheet 32. The side of the sheet 32 that sandwiches the string member 31 may be provided with an arcuate groove for accommodating the string member 31 in the longitudinal direction.

The string member 31 may be formed of the same material as the tape member 1 of the embodiment shown in FIG. 1, and the sheet 32 may be a film applied with silicon processing or silicon paper formed of a paper shaped silicon resin.

Though the string member 31 applied with an adhesive is covered up by a pair of sheets 32, 32 in the shape of a narrow tape in the embodiment shown in FIG. 12, the double eyelid forming string according to the present invention is not limited to this embodiment. For example, the string member 31 may be covered up by a sheet 32 in the shape of a narrow tape having a breaking point 33 to be broken when it is stretched on one side of the string member 31 and by a release paper on the other side thereof. Alternatively, holding portions having no adhering property for holding with fingertips may be provided at both ends of the string member 31 applied with an adhesive thereon.

Alternatively, in the double eyelid forming string described above, a tubular jacket having a breaking point 33 to be broken when being stretched at the center of the length thereof may be used for covering up the string member 31 applied with the adhesive instead of covering the string member 31 applied with an adhesive with the tape shaped sheets 32, 32.

In the double eyelid forming string described above, it is not necessarily required to apply an adhesive all over the surface of the string member 31 as far as it has no disadvantage for adhering the string member under a tension on the eyelid.

Figure 14:
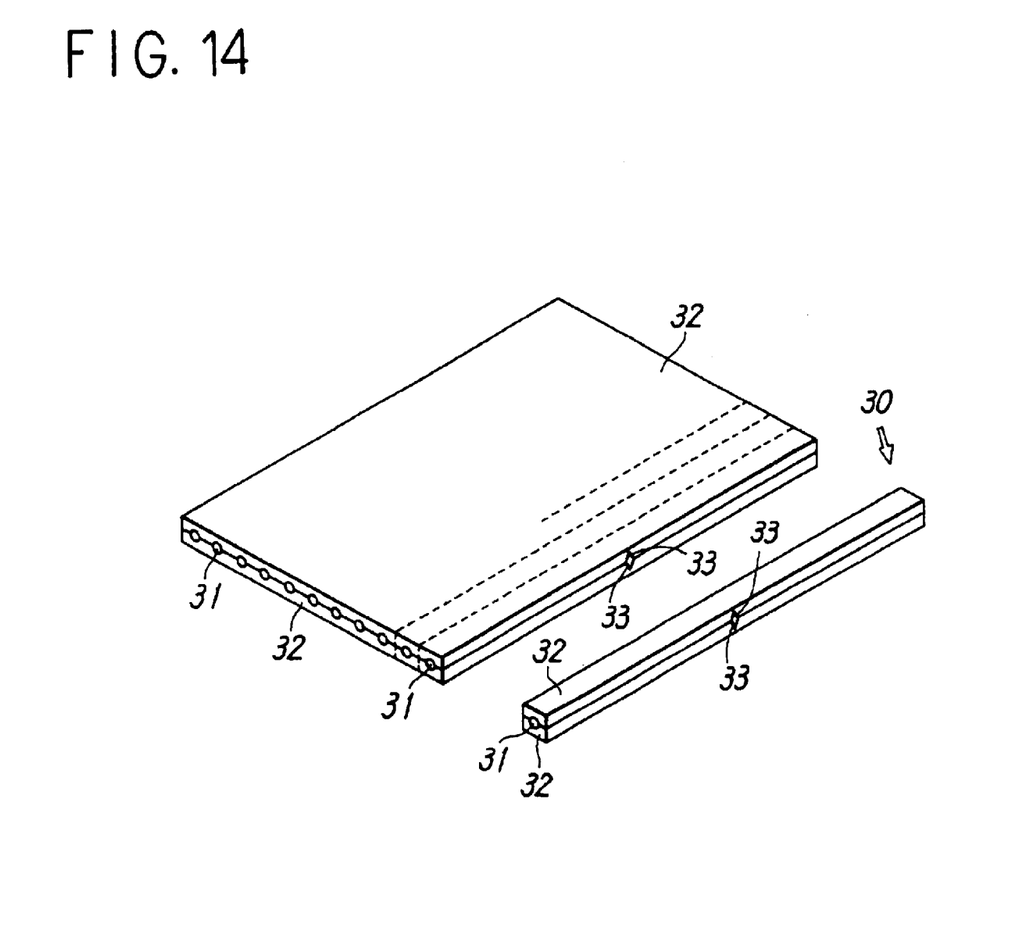
FIG. 14 is a perspective view showing an example of manufacture of the double eyelid forming string according to the present invention.

FIG. 14 is an example of a method of manufacturing the double eyelid forming string described above.

The method of manufacturing the double eyelid forming string 30 comprises the steps of providing a V-shaped notched grooves 33 at the center of the sheet 32 of a given length formed of a film applied with silicon processing or of silicon paper, applying an adhesive on a plurality of resiliently elastic string members 31 cut into more or less the same length as the sheet 32, placing the plurality of string members 31 applied with an adhesive in parallel on the surface of the sheet 32 to be adhered, placing another sheet 32 thereon and joining a pair of sheets with each other, whereby adhering the string member applied with the adhesive in parallel on the seat 32 having a notched groove, and cutting the sheet 32 adhered with the plurality of string members along the string members into narrow strings.

Though the string member 31 applied with an adhesive are adhered in parallel between a pair of sheets 32, 32 each formed with a notched groove in the direction of the width in the embodiment shown in FIG. 14, it is not limited thereto, and, for example, it is also possible to manufacture it by adhering a plurality of string members 31 applied with an adhesives in parallel on a sheet 32 formed at the center thereof with a notched groove, adhering a release sheet thereon, and cutting the sheet adhered with the plurality of string member and a release sheet along the string members into narrow strips.

A method of forming an eyelid with a fold by the use of the double eyelid forming string 30 shown in FIG. 12 is the same as the method of forming an eyelid with a fold by the use of the double eyelid forming tape of the embodiments shown in FIG. 1 and FIG. 5–FIG. 7.

What is claimed is:

1. A double eyelid forming article of manufacture comprising:
   a resiliently stretchable tape member comprising a synthetic resin material, having an adjustable length and having flat upper and lower surfaces;
   a layer of adhesive on at least one of the upper and lower surfaces of the tape member; and
   at least one release sheet having a breaking point configured to break when the tape member is being stretched, the at least one release sheet being located on the layer of adhesive which is located on at least one of the upper and lower surfaces of the tape member,
   wherein the tape member is configured to provide a sufficient amount of recoil after adhered on an eyelid such that the tape member breaks into the eyelid and forms a fold in the eyelid; and the breaking point is a notched groove formed substantially at a center portion of a length of the at least one release sheet.

2. A double eyelid forming article of manufacture comprising:

a resiliently stretchable string member comprising a synthetic resin material, having an adjustable length and having arcuate upper and lower surfaces;

a layer of adhesive on at least one of the upper and lower surfaces of the string member; and a releasable jacket covering the string member and having a breaking point configured to break when the string member is being stretched, the breaking point being located substantially at a center portion of the string member, wherein the string member is configured to provide a sufficient amount of recoil after adhered on an eyelid such that the tape member breaks into the eyelid and forms a fold in the eyelid.

3. A method of manufacturing a double eyelid forming article of manufacture configured to form a fold in an eyelid of a user, the method comprising:

providing a sheet member configured to be cut into a plurality of tape members and comprising a resiliently stretchable synthetic resin material which provides a sufficient amount of recoil after adhered on an eyelid such that each of the plurality of tape members breaks into the eyelid and forms a fold in the eyelid;

applying a layer of adhesive on at least one of upper and lower surfaces of the sheet member;

cutting the sheet member alone straight, linear cutting lines from the first lengthwise end to the second lengthwise end to form the plurality of tape members which are of a uniform width of approximately 1 to 3 mm; and attaching a release sheet configured to have a notched groove substantially at a center portion of the length thereof on at least one of the surfaces of the sheet member applied with an adhesive.

4. A method of using a double eyelid forming article of manufacture configured to form a fold in an eyelid of a user, the method comprising the steps of:

providing a tape member made of a synthetic resin material configured to be resiliently stretchable;

holding the ends of the tape member with fingers of the user;

stretching the tape member in a length direction thereof;

pressing the tape member to an eyelid of a user of the tape member to adhere the tape member to the eyelid of the user;

allowing the tape member to resiliently contract at least somewhat to an original unstretched state so that the tape member breaks into the eyelid of the user; and forming a fold in the eyelid of the user of the tape member.

5. The method according to claim 4, further comprising cutting the ends of the tape member that has been adhered to the eyelid of the user.

6. A method of using a double eyelid forming article of manufacture configured to form a fold in an eyelid of a user, the method comprising the steps of:

providing a string member made of a resiliently stretchable material;

stretching the string member in a length direction thereof;

pressing the string member to an eyelid of a user of the string member to adhere the string member to the eyelid of the user;

allowing the string member to resiliently contract at least somewhat to an original unstretched state so that the string member breaks into the eyelid of the user; and forming a fold in the eyelid of the user of the string member.

* * * * *